(12) United States Patent
Oh (10) Patent No.: US 7,033,034 B2
(45) Date of Patent: Apr. 25, 2006

(54) BACKLIGHT ASSEMBLY PROVIDING LIGHT IN MULTIPLE DIRECTIONS AND DISPLAY DEVICE EMPLOYING THE SAME

(75) Inventor: Jeong-Seok Oh, Seoul (KR)

(73) Assignee: Samsung Electronics Co., Ltd., (KR)

( * ) Notice: Subject to any disclaimer, the term of this patent is extended or adjusted under 35 U.S.C. 154(b) by 124 days.

(21) Appl. No.: 10/771,918

(22) Filed: Feb. 4, 2004

(65) Prior Publication Data

US 2005/0024844 A1 Feb. 3, 2005

(30) Foreign Application Priority Data

Aug. 1, 2003 (KR) .................. 10-2003-0053509

(51) Int. Cl.
*F21V 8/00* (2006.01)
(52) U.S. Cl. .................. 362/31; 362/555; 362/616
(58) Field of Classification Search ............... 362/31, 362/555, 26, 616
See application file for complete search history.

(56) References Cited

U.S. PATENT DOCUMENTS 5,276,591 A * 1/1994 Hegarty ................ 362/601
6,871,975 B1 * 3/2005 Chuang ................ 362/27
2004/0264211 A1 * 12/2004 Han et al.

FOREIGN PATENT DOCUMENTS

JP 2003-222863 A * 8/2003

* cited by examiner

*Primary Examiner*—Laura K. Tso
(74) *Attorney, Agent, or Firm*—Cantor Colburn LLP (57) ABSTRACT

A backlight assembly includes a light source, a first light guide plate and a second light guide plate, in which the amount of light output from the first light guide plate is different from the amount of light output from the second light guide plate. A light output surface of the light source has an areal size substantially equal to the sum of areal sizes of light incident surfaces of the first and second light guide plates. The light guide plates each may have a different thickness, or the position of the light source with respect to the light incident surfaces is changed to control the amount of light output from the respective light guide plates. A display device includes a first display unit displaying first images using the light from the first light guide plate and a second display unit displaying second images using the light from the second light guide plate.

30 Claims, 8 Drawing Sheets

BACKLIGHT ASSEMBLY PROVIDING LIGHT IN MULTIPLE DIRECTIONS AND DISPLAY DEVICE EMPLOYING THE SAME

BACKGROUND OF THE INVENTION

1. Field of the Invention

The present invention relates to a backlight assembly for providing light in a display device, and more particularly to a backlight assembly generating light in multiple directions in a display device displaying images on multiple display units.

2. Description of the Related Art

Various types of display devices have been developed for electronic goods employing an image display part as its primary or secondary function. One of the popular image display devices is a liquid crystal display (LCD) device which utilizes the light characteristics of liquid crystal. Molecular arrangement of liquid crystal varies in response to an electric filed applied thereto, so that light transmittance of the liquid crystal is changed. An LCD device displays images using such light transmit characteristics of the liquid crystal.

Generally, the electronic goods, such as cellular phones, portable computers, desktop computers, etc., employ an image display device (e.g., LCD device) that displays images on a single display unit disposed in one direction. As there has been a trend of employing multiple display units displaying images in different directions, display devices have been developed to display images in multiple directions, mostly two directions. Also, a backlight assembly for providing light in a display device has been developed to be used for the multi-direction display devices.

For example, in a conventional two-way display device, images are displayed on one display unit and other images are displayed on another display unit. The two display units are disposed in two different directions (e.g., opposite directions). In other words, a display device has a first display unit for displaying first images and a second display unit for displaying second images, and the first and second display units are disposed in first and second directions, respectively, which are different from each other.

Such two-way display devices have a two-way backlight assembly that provides light in two different directions. In other words, the two-way backlight assembly provides first light in the first direction and second light in the second direction for the first and second display units, respectively. In such a conventional two-way backlight assembly, there are a light source generating light and two light guide plates for guiding light to be provided to the two display units. The light generated from the light source is divided into first and second light by the first and second light guide plates, respectively, and the divided light is provided to the first and second display units, respectively.

However, since the first and second light guide plates of a conventional two-way backlight assembly have a substantially identical thickness, it is unable or difficult to control the amount of light divided from the light generated by the light source. In other words, the first and second light guide plates each receive the same amount of light from the light source so that the light guide pages each output the same amount of light to the corresponding display unit.

Thus, in case that a display device selectively operates the two display units to display images only on a selected display unit or needs more light at one display unit than at the other display unit because of differences between images displayed in the first and second display units, a conventional two-way display device employing the conventional two-way backlight assembly is unable to provide different amounts of light to the two display units.

Therefore, it is desired that a backlight assembly for providing light in a display unit is improved so that the amount of light provided to different display units of the display device is controlled to supply a proper amount of light to the respective display units. It is also desirable to provide a display device that employs such backlight assembly so as to improve the image quality of the respective display units.

BRIEF SUMMARY OF THE INVENTION

The above-discussed and other drawbacks and deficiencies of the prior art are overcome or alleviated by the enhanced performance telecommunications connector of the present invention. In one embodiment, a backlight assembly for proving light in different directions, includes a light source for generating light, a first light guide plate receiving the light from the light source and guiding the received light to output first light in a first direction toward a first display unit, and a second light guide plate receiving the light from the light source and guiding the received light to output second light in a second direction toward a second display unit, wherein the amount of the first light is different from the amount of the second light. The light source has a light output surface generating the light toward first and second light incident surfaces of the first and second light guide plates, and the light output surface has an areal size substantially equal to a sum of areal sizes of the first and second light incident surfaces. When the amount of the first light is larger than the amount of the second light, the areal size of the first light incident surface is larger than that of the second light incident surface. When the amount of the second light is larger than an amount of the first light, the areal size of the second light incident surface is larger than that of the first light incident surface.

In another embodiment, the first and second light incident surfaces have a substantially identical areal size, and the light source is disposed in different positions adjacent to the first and second light incident surfaces to control amounts of the first and second lights, respectively. When the amount of the first light is larger than the amount of the second light, the light source is disposed such that the light output surface covers first and second areas of the first and second light incident surfaces, respectively, in which the first area is larger than the second area. When the amount of the second light is larger than the amount of the first light, the light source is disposed such that the light output surface covers first and second areas of the first and second light incident surfaces, respectively, in which the second area is larger than the first area.

In another embodiment, a display device for displaying images on different display units, includes a first display unit displaying first images using first light, a second display unit displaying second images using second light, and the backlight assembly that is one of the above embodiments. The display device also may include a reflection plate disposed between the first and second light guide plates, a first optical member disposed on a light exiting surface of the first light guide plate, the first optical member increasing luminance of the first light, a second optical member disposed on a light exiting surface of the second light guide plate, the second optical member increasing luminance of the second light, a first receiving container holding the first light guide plate and the light source, a second receiving container receiving the first receiving container, the first light guide palate and the light source, and having an opening through which the second light guide plate is disposed, and a third receiving container receiving the second light guide plate, which is combined with the second receiving container to cover the opening.

These and other objects, features and advantages of the present invention will become apparent from the following detailed description of illustrative embodiments thereof, which is to be read in connection with the accompanying drawings.

BRIEF DESCRIPTION OF THE DRAWINGS

This disclosure will present in detail the following description of exemplary embodiments with reference to the following figures wherein.

DESCRIPTION OF THE PREFERRED EMBODIMENTS

Detailed illustrative embodiments of the present invention are disclosed herein. However, specific structural and functional details disclosed herein are merely representative for purposes of describing exemplary embodiments of the present invention.

Figure 1:
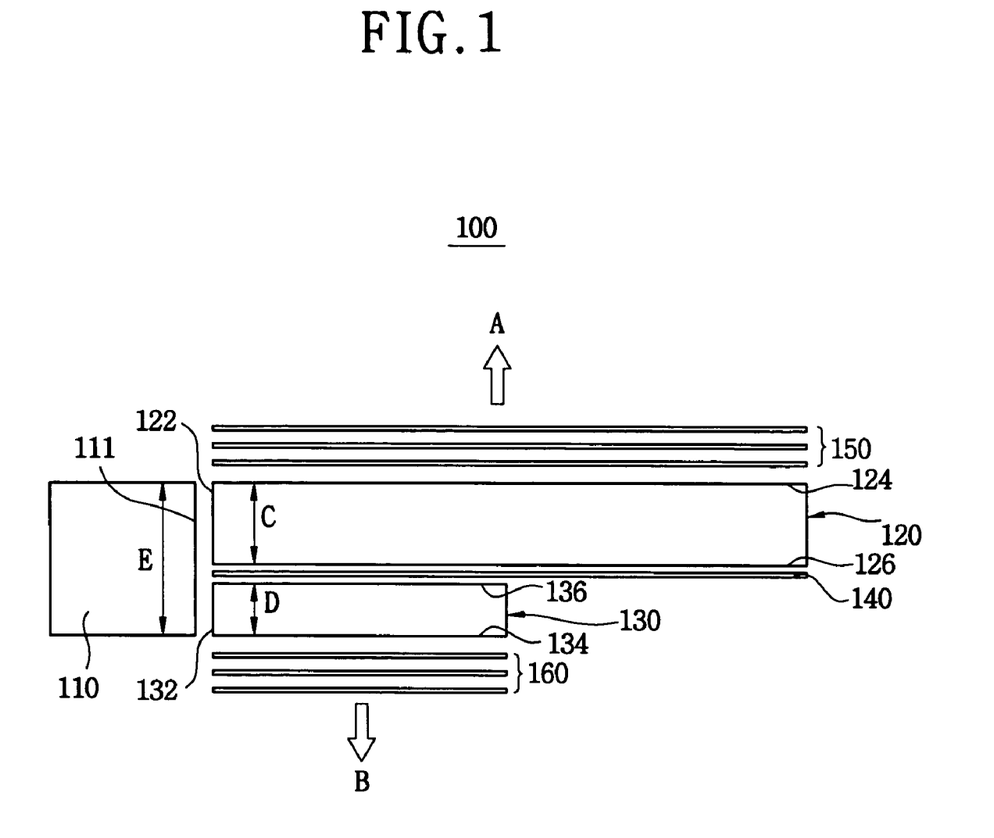
FIG. 1 is a cross-sectional view of a backlight assembly according to an exemplary embodiment of the present invention.

FIG. 1 is a cross-sectional view of a backlight assembly according to an exemplary embodiment of the present invention. Referring to FIG. 1, the backlight assembly 100 includes a light source 110, first and second light guide plates 120, 130, and a reflection plate 140 disposed between the first and second light guide plates 120, 130. The backlight assembly of this embodiment provides light in two directions A and B, so that it may be called "two-way backlight assembly."

The light source 110 is disposed adjacent to the first and second light guide plates 120, 130 and provides light to one side of the respective light guide plates 120, 130. The light source 110 includes, for example, one or more fluorescent lamps or light emitting diodes for generating the light to the sides of the first and second light guide plates 120, 130.

The first and second light guide plates 120, 130 each have a hexahedral shape with two opposite surfaces and four sidewalls. Particularly, the first light guide plate 120 has a first light incident surface 122, a first light reflecting surface 126, and a first light exiting surface 124. The light generated from the light source 110 is incident onto the first light incident surface 122 and travels in the first light guide plate 120. The light traveling in the first light guide plate 120 directly exits through the first light exiting surface 124 or is reflected on the first light reflecting surface 126 toward the first light exiting surface 124 to exit therethrough. Thus, the first light guide plate 120 outputs the light in direction A as shown in FIG. 1.

The second light guide plate 130 also has a second light incident surface 132, a second light reflecting surface 136, and a second light exiting surface 134. The light generated from the light source 110 is incident onto the second light incident surface 132 and travels in the second light guide plate 130. The light traveling in the second light guide plate 130 directly exits through the second light exiting surface 134 or is reflected on the second light reflecting surface 136 toward the second light exiting surface 134 to exit therethrough. Thus, the second light guide plate 130 outputs the light in direction B as shown in FIG. 1.

The first and second light plates 120, 130 may have a substantially same size or different sizes. In this embodiment, the first light guide plate 120 has a larger size than that of the second light guide plate 130 to generate more amount of light in direction A than in direction B. Since the first light guide plate 120 is thicker than the second light guide plate 130 as shown in FIG. 1, the first light guide plate 120 receives more amount of light from the light source 110 than the second light guide plate 130 does.

In this embodiment, the light source 110 has a light output surface 111 through which the light is provided toward the first and second light guide plates 120, 130, and the light output surface 111 has an areal size substantially equal to the sum of areal sizes of the fist and second light incident surfaces 122, 132. Also, the first light incident surface 122 has an areal size larger than that of the second light incident surface 132. To provide such configuration, for example, the first and second light guide plates 120, 130 have thicknesses C and D, respectively, and the light source 110 has thickness E, and the first and second light guide plates 120, 130 and the light source 110 are manufactured such that thickness C is larger than thickness D and thickness E is substantially equal to the sum of thickness C and thickness D. Thus, the first light guide plate 120 receives more amount of light via the first light incident surface 122 than the second light guide plate 130 does via the second light incident surface 132.

The reflecting plate 140 is disposed between the first and second light guide plates 120, 130 to reflect light leaking from the first and second light guide plates 120, 130. In other words, the light leaking from the first and second light reflecting surfaces 126, 136 is reflected by the reflection plate toward the first and second light exiting surfaces 124, 134, respectively.

The backlight assembly 100 also includes a first optical member 150 disposed on the first light exiting surface 124 of the first light guide plate 120, and a second optical member 160 disposed on the second light exiting surface 134 of the second light guide plate 130. The first and second optical members 150, 160 each include a diffusion sheet for diffusing the light provided from the light guide plate 120 or 130, and one or more prism sheet(s) for condensing the light to increase the luminance and viewing angle of the light outputting through the optical member 150 or 160.

Figure 2:
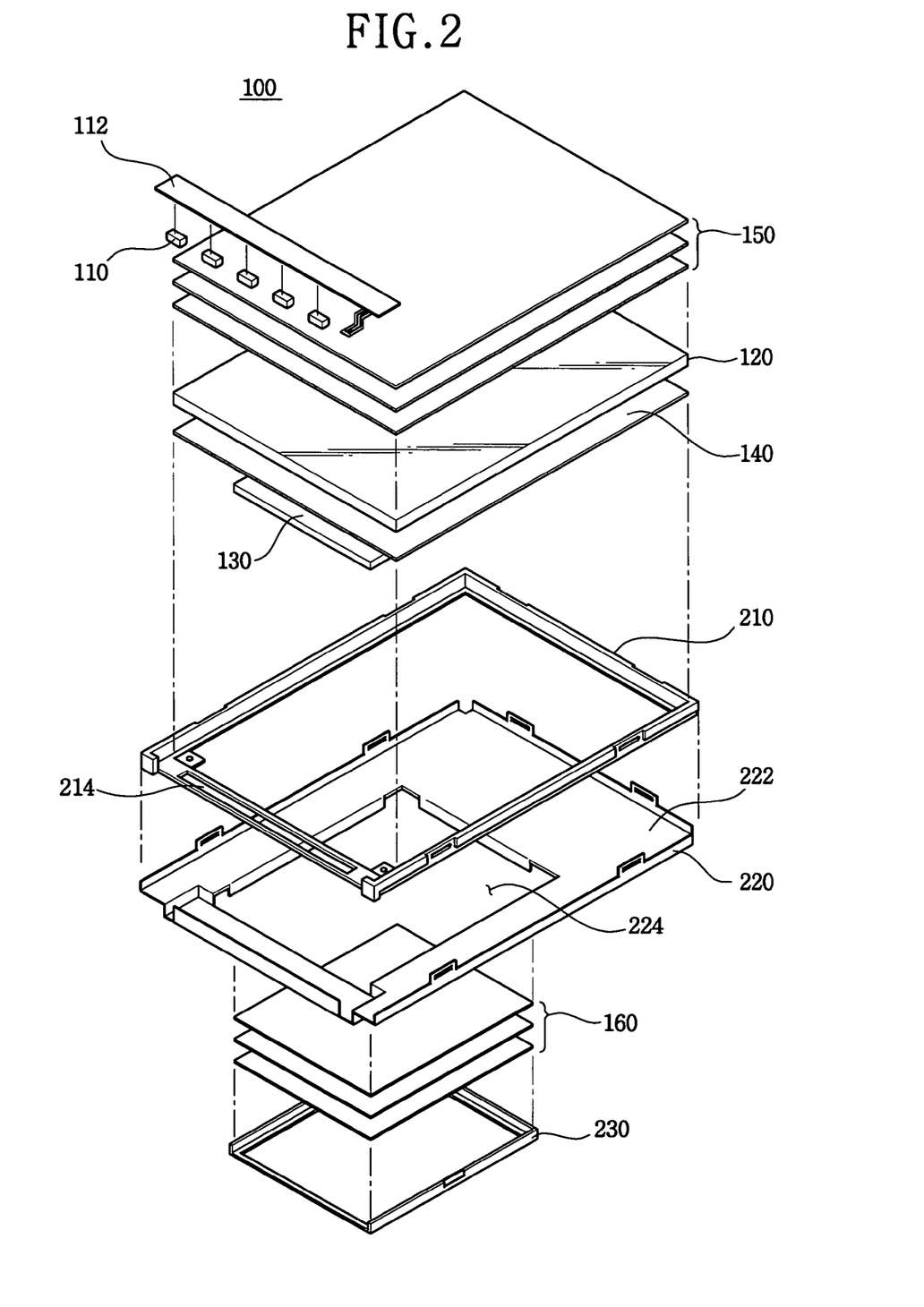
FIG. 2 is an exploded perspective view of the backlight assembly in FIG. 1 assembled with receiving containers according to the present invention.

FIG. 2 is an exploded perspective view of the backlight assembly in FIG. 1 assembled with receiving containers according to the present invention. In FIG. 2, the same parts as those shown in FIG. 1 are represented with like reference numerals and their detailed description will be omitted to avoid description duplication. Referring to FIG. 2, the backlight assembly 100 includes a first receiving container 210 for holding the light source 110 and the first light guide plate 120, a second receiving container 220 for receiving the light source 110 and the first light guide plate 120 securely held by the first receiving container 210, and a third receiving container 230 for securing the second light guide plate 130.

The reflecting plate 140 is disposed in a receiving space formed between the first and second receiving containers 210, 220. The first receiving container 210 has an opening 214 at its edge area to receive the light source 110. Since the light source 110 includes multiple light emitting diodes that are linearly aligned at the side of the first and second light guide plates 120, 130, the opening 214 is disposed at the edge area corresponding to the position of the light source 110 and has a rectangular shape appropriate to receive the light source 110. The second receiving container 220 also has an opening 224 to receive the second light guide plate 130. Thus, the opening 224 of the second receiving container 220 has a size and a shape substantially equal to those of the second light guide plate 130. This will be described in detail referring to FIG. 4.

The third receiving container 230 for receiving and securely holding the second light guide plate 130 is combined with the second receiving container 220. The third receiving container 230 has a size and a shape appropriate to cover the opening 224 of the second receiving container 220 and is disposed on the opening 224 at the side of the second receiving container 220 opposite to the side at which the first receiving container 210 is disposed.

Figure 3:
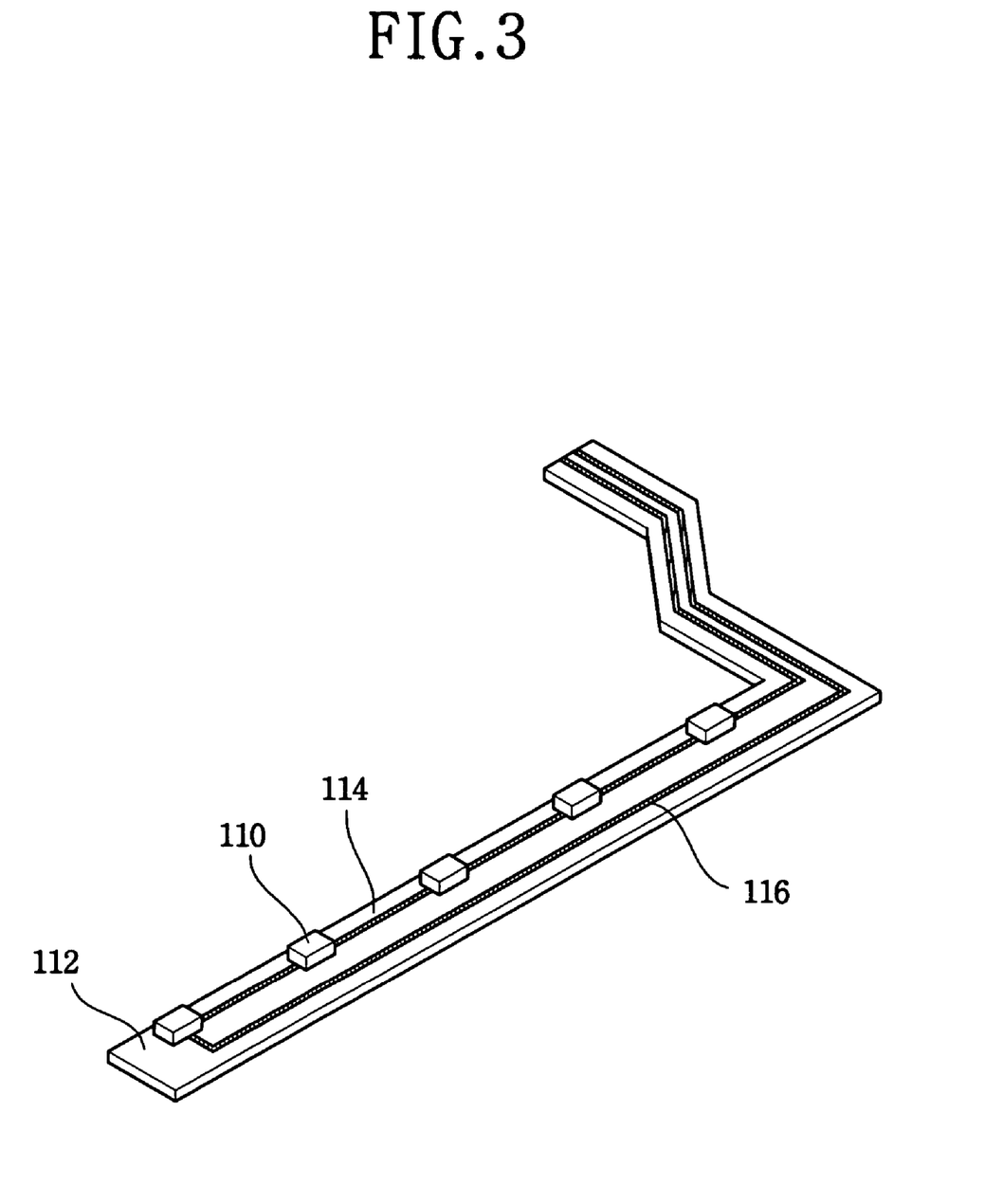
FIG. 3 is a perspective view of the light source in FIG. 2.

FIG. 3 is a perspective view of the light source in FIG. 2. In this embodiment, the light source 110 includes multiple light emitting diodes which are collocated in alignment on a flexible printed circuit (FPC) 112.

The FPC 112 includes a base substrate 114 and a conducting wire 116 formed on the base substrate 114. The conducting wire 116 connects the light emitting diodes in series to provide a driving voltage to the respective light emitting diodes. The FPC 112 combined with the light emitting diodes is disposed in the opening 214 of the first receiving container 210 and received in a selected area of the second receiving container 220 (referring to FIG. 2).

Figure 4:
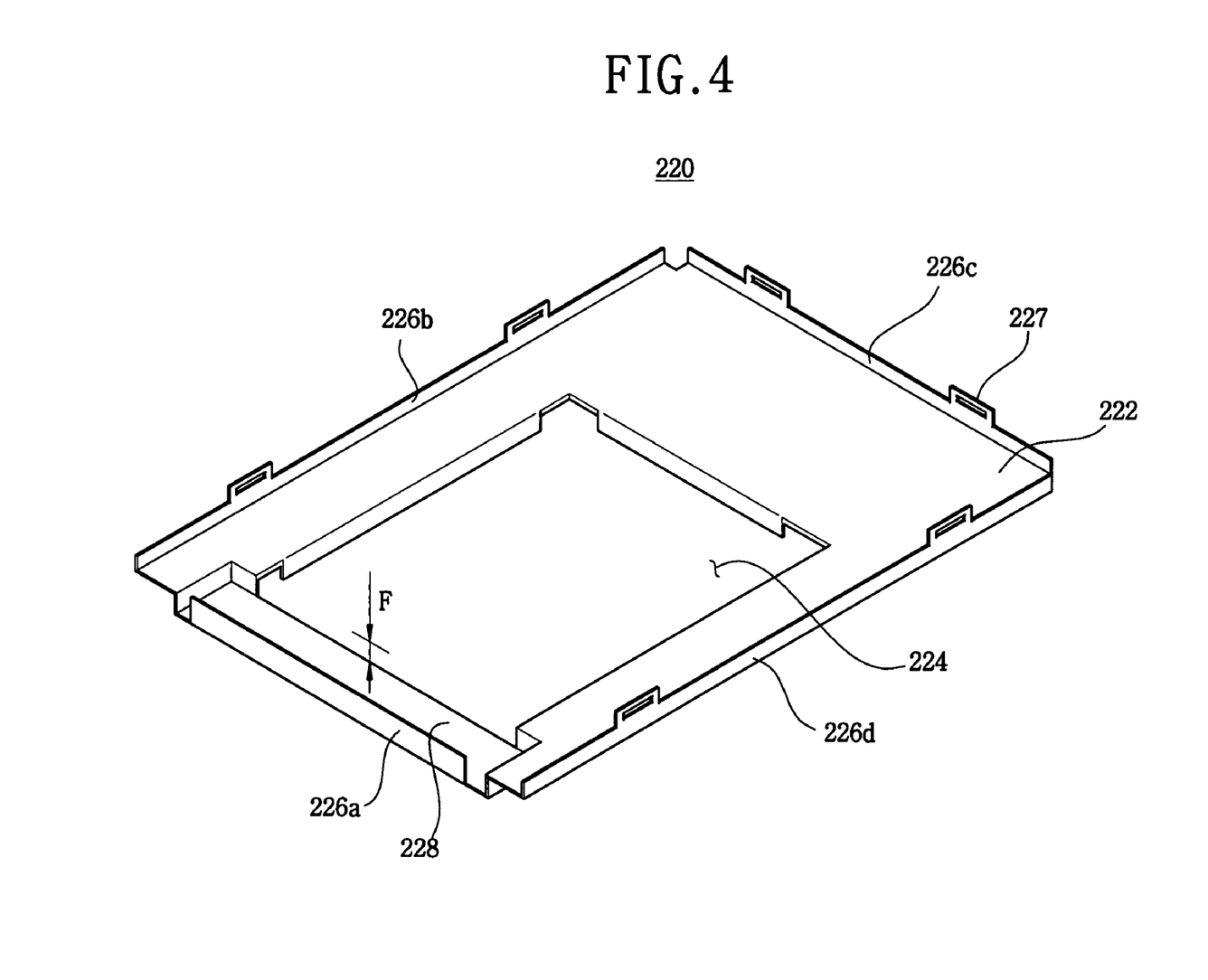
FIG. 4 is a perspective view of the second receiving container in FIG. 2.

FIG. 4 is a perspective view of the second receiving container 220 shown in FIG. 2. In this embodiment, the second receiving container 220 includes a bottom surface 222 and first to fourth sidewalls 226a–226d. The second receiving container 220 is securely combined with the first receiving container 210 using hooks 227 formed at the second to fourth sidewalls 226b–226d.

The opening 224 is formed in the bottom surface 222 at an area corresponding to the second light guide plate 130 so that the second light guide plate 130 is disposed in the opening 224. The second receiving container 220 also includes a receiving recess 228 for receiving the light source 110. The receiving recess 228 is formed at an area between the first sidewall 226a and the opening 224. The receiving recess 228 is protruded downwardly from the bottom surface 222, and has a shape and a size appropriate to received the light source 110. For example, the receiving recess 228 has thickness F substantially equal to the thickness D of the second light guide plate 130.

Figure 5:
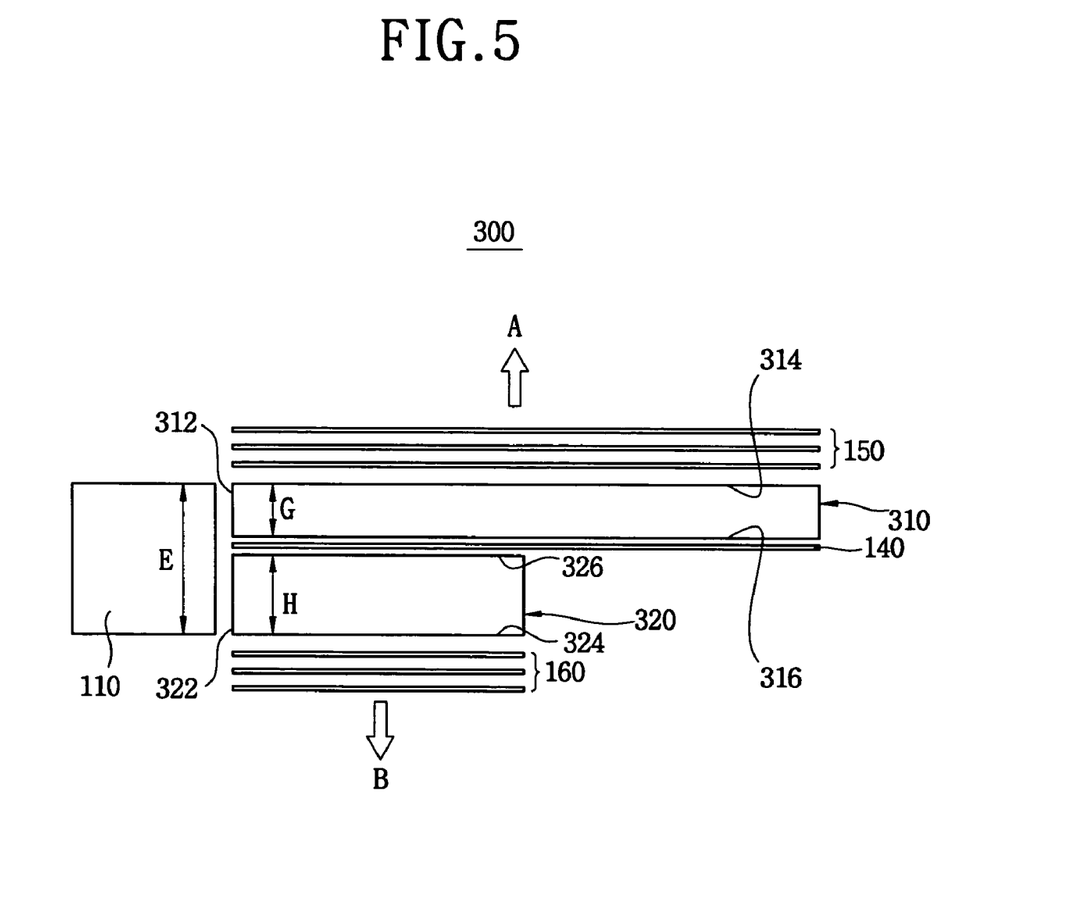
FIG. 5 is a cross-sectional view of a backlight assembly according to another exemplary embodiment of the present invention.

FIG. 5 is a cross-sectional view of a backlight assembly according to another exemplary embodiment of the present invention. In FIG. 5, the same parts as those shown in FIG. 1 are represented with like reference numerals and their detailed description will be omitted to avoid description duplication. In this embodiment, the backlight assembly 300 includes the light source 110, the reflection plate 140, and the first and second optical members 150, 160 which have the substantially same structure and configuration as those in FIG. 1. The backlight assembly 300 also includes first and second light guide plates 310, 320 for receiving the light from the light source 110 and guiding the light to exit toward different display units (referring to FIG. 8) in directions A and B.

The first and second light guide plates 310, 320 each have a hexahedral shape with two opposite surfaces and four sidewalls. Particularly, the first light guide plate 310 has a first light incident surface 312, a first light reflecting surface 316, and a first light exiting surface 314. The light generated from the light source 110 is incident onto the first light incident surface 312 and travels in the first light guide plate 310. The light traveling in the first light guide plate 310 directly exits through the first light exiting surface 314 or is reflected on the first light reflecting surface 316 toward the first light exiting surface 314 to exit therethrough. Thus, the first light guide plate 310 outputs the light in direction A as shown in FIG. 5.

The second light guide plate 320 also has a second light incident surface 322, a second light reflecting surface 326, and a second light exiting surface 324. The light generated from the light source 110 is incident onto the second light incident surface 322 and travels in the second light guide plate 320. The light traveling in the second light guide plate 320 directly exits through the second light exiting surface 324 or is reflected on the second light reflecting surface 326 toward the second light exiting surface 324 to exit therethrough. Thus, the second light guide plate 320 outputs the light in direction B as shown in FIG. 5.

The first and second light plates 310, 320 may have a substantially same structure or different structures. In this embodiment, the first and second light guide plates 310, 320 each have a different structure so that more amount of light is provided in direction B than in direction A. For example, the first light guide plate 310 has a thickness larger than that of the second light guide plate 320 as shown in FIG. 5, so that the first light guide plate 310 receives more amount of light from the light source 110 than the second light guide plate 320 does.

In this embodiment, the light output surface 111 of the light source 110 has an areal size substantially equal to the sum of areal sizes of the fist and second light incident surfaces 312, 322, and the second light incident surface 322 has an areal size larger than that of the first light incident surface 312. To provide such configuration, for example, the first and second light guide plates 310, 320 have thicknesses G and H, respectively, and the first and second light guide plates 310, 320 and the light source 110 are manufactured such that thickness H is larger than thickness G and thickness E is substantially equal to the sum of thickness G and thickness H. Thus, the second light guide plate 320 receives more amount of light via the second light incident surface 322 than the first light guide plate 310 does via the first light incident surface 312. Thus, the backlight assembly 300 provides more amount of light in direction B via the second light guide plate 320 than in direction A via the first light guide plate 31.

Figure 6:
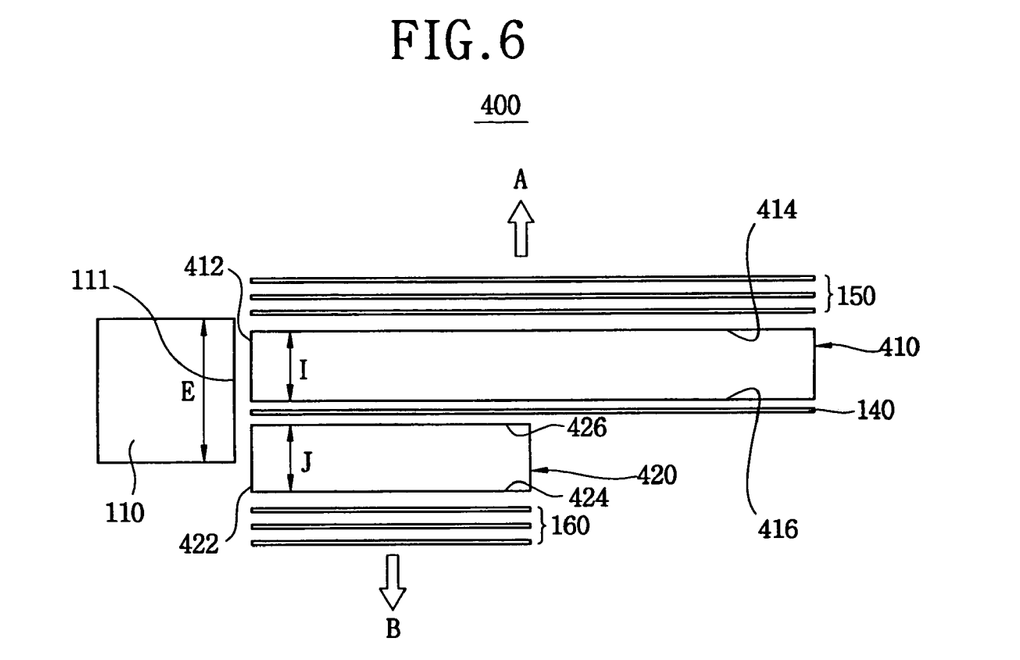
FIGS. 6 and 7 are cross-sectional views of a backlight assembly according to another exemplary embodiment of the present invention.
Figure 7:
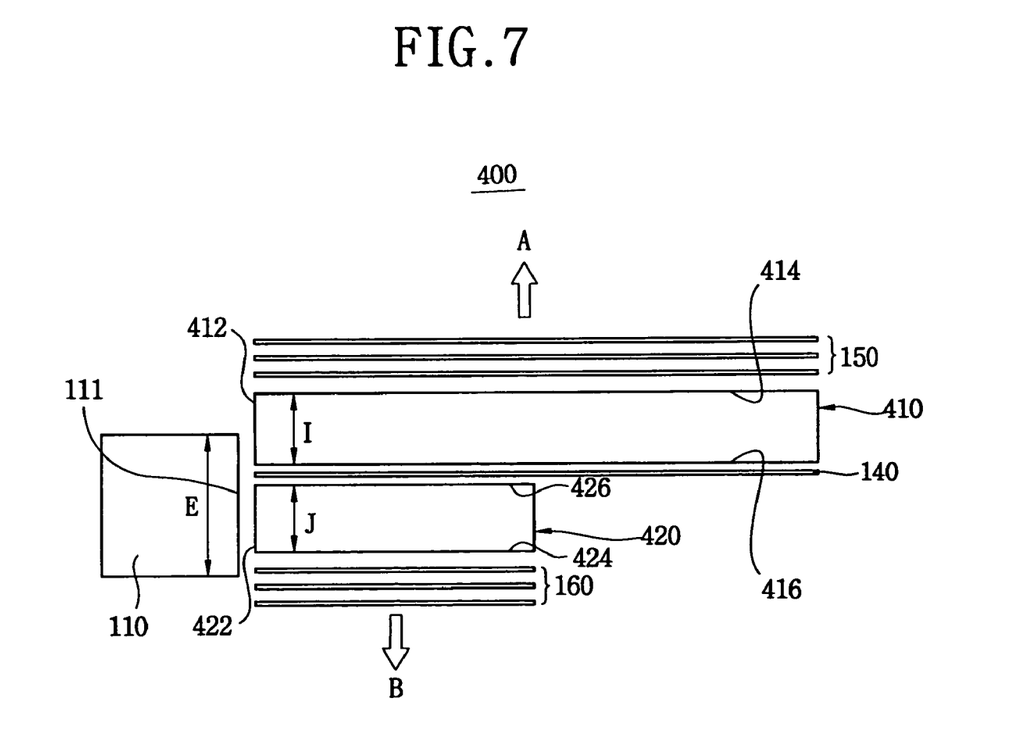

FIGS. 6 and 7 are cross-sectional views illustrating a backlight assembly according to another exemplary embodiment of the present invention. In FIGS. 6 and 7, the same parts as those shown in FIG. 1 or 5 are represented with like reference numerals and their detailed description will be omitted to avoid description duplication. In this embodiment, the backlight assembly 400 includes the light source 110, the reflection plate 140, and the first and second optical members 150, 160 which have the substantially same structure and configuration as those in FIGS. 1 and 5. The backlight assembly 400 also includes first and second light guide plates 410, 420 for receiving the light from the light source 110 and guiding the light to exit toward different display units (referring to FIG. 8) in directions A and B.

The first and second light guide plates 410, 420 each have a hexahedral shape with two opposite surfaces and four sidewalls. Particularly, the first light guide plate 410 has a first light incident surface 412, a first light reflecting surface 416, and a first light exiting surface 414. The light generated from the light source 110 is incident onto the first light incident surface 412 and travels in the first light guide plate 410. The light traveling in the first light guide plate 410 directly exits through the first light exiting surface 414 or is reflected on the first light reflecting surface 416 toward the first light exiting surface 414 to exit therethrough. Thus, the first light guide plate 410 outputs the light in direction A.

The second light guide plate 420 also has a second light incident surface 422, a second light reflecting surface 426, and a second light exiting surface 424. The light generated from the light source 110 is incident onto the second light incident surface 422 and travels in the second light guide plate 420. The light traveling in the second light guide plate 420 directly exits through the second light exiting surface 424 or is reflected on the second light reflecting surface 426 toward the second light exiting surface 424 to exit therethrough. Thus, the second light guide plate 420 outputs the light in direction B.

The first and second light plates 410, 420 may have a substantially same structure or different structures. In this embodiment, the first and second light guide plates 410, 420 have the first and second light incident surfaces 412, 422, respectively, which have a substantially same shape, and the source light 110 is disposed in different positions at the side of the first and second light guide plates 410, 420. By varying the positions of the light source 110, the amount of light generated through each of the first and second light guide plates 410, 420 is controlled.

In FIG. 6, the backlight assembly 400 provides more amount of light in direction A via the first light guide plate 410 than in direction B via the second light guide plate 420. In other words, the first light incident surface 412 receives more amount of light from the light source 110 than the second light incident surface 422 does.

In this embodiment, the first and second light incident surfaces 412, 422 have a substantially same areal size, and the light output surface 111 of the light source 110 has an areal size substantially equal to the sum of areal sizes of the fist and second light incident surfaces 412, 422. For example, the first and second light guide plates 410, 420 have thicknesses I and J, respectively, and the first and second light guide plates 410, 420 and the light source 110 are manufactured such that thickness I is substantially equal to thickness J and thickness E is substantially equal to the sum of thickness I and thickness J. In order to provide more amount of light to the first light guide plate 410, the position of the light source 110 is biased toward the first light gate plate 410. In other words, the light source 110 is disposed such that the light output surface 111 covers a larger area of the first light incident surface 412 than that of the second light incident surface 422. For example, the light output surface 111 covers the entire area of the first light incident surface 412 while it covers a portion of the second light incident surface 422. Thus, more amount of the light is provided to the first light guide plate 410 via the first light incident surface 412 than to the second light guide plate 420 via the second light incident surface 422. As a result, the backlight assembly 400 in FIG. 6 provides more amount of light in direction A via the first light guide plate 410 than in direction B via the second light guide plate 420.

Referring to FIG. 7, the backlight assembly 400 provides more amount of light in direction B via the second light guide plate 420 than in direction A via the first light guide plate 410. In other words, the second light incident surface 422 receives more amount of light from the light source 110 than the first light incident surface 412 does.

In this embodiment, to provide more amount of light to the second light guide plate 420, the position of the light source 110 is biased toward the second light gate plate 420. In other words, the light source 110 is disposed such that the light output surface 111 covers a larger area of the second light incident surface 422 than that of the first light incident surface 412. For example, the light output surface 111 covers the entire area of the second light incident surface 422 while it covers a portion of the first light incident surface 412. Thus, more amount of the light is provided to the second light guide plate 420 via the second light incident surface 422 than to the first light guide plate 410 via the first light incident surface 412. As a result, the backlight assembly 400 in FIG. 7 provides more amount of light in direction B via the second light guide plate 420 than in direction A via the first light guide plate 410.

The position of the light source 110, more particularly, the position of the light output surface 111, with respect to the first and second light incident surfaces 412, 422 is changed to control the amount of light generated through the respective light guide plates 410, 420. As the light output surface 111 covers a larger area of one of the light incident surfaces 412, 422 than the other, the more amount of light is provided to the light incident surface than the other so that the light guide plate of the light incident surface receiving more amount light outputs more amount of light than the other light guide plate does.

Figure 8:
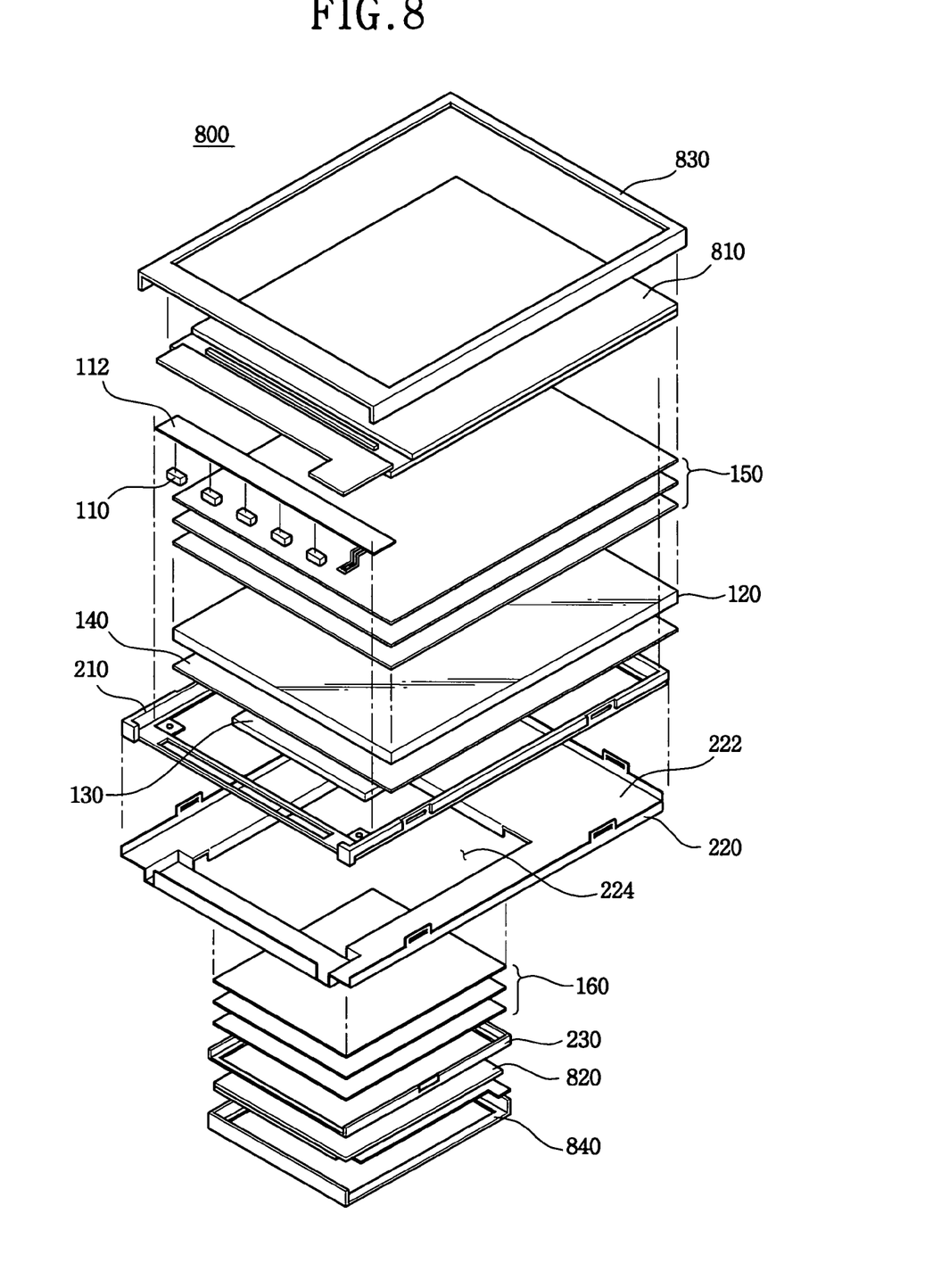
FIG. 8 is an exploded perspective view of an LCD device according to an exemplary embodiment of the present invention.
Figure 9:
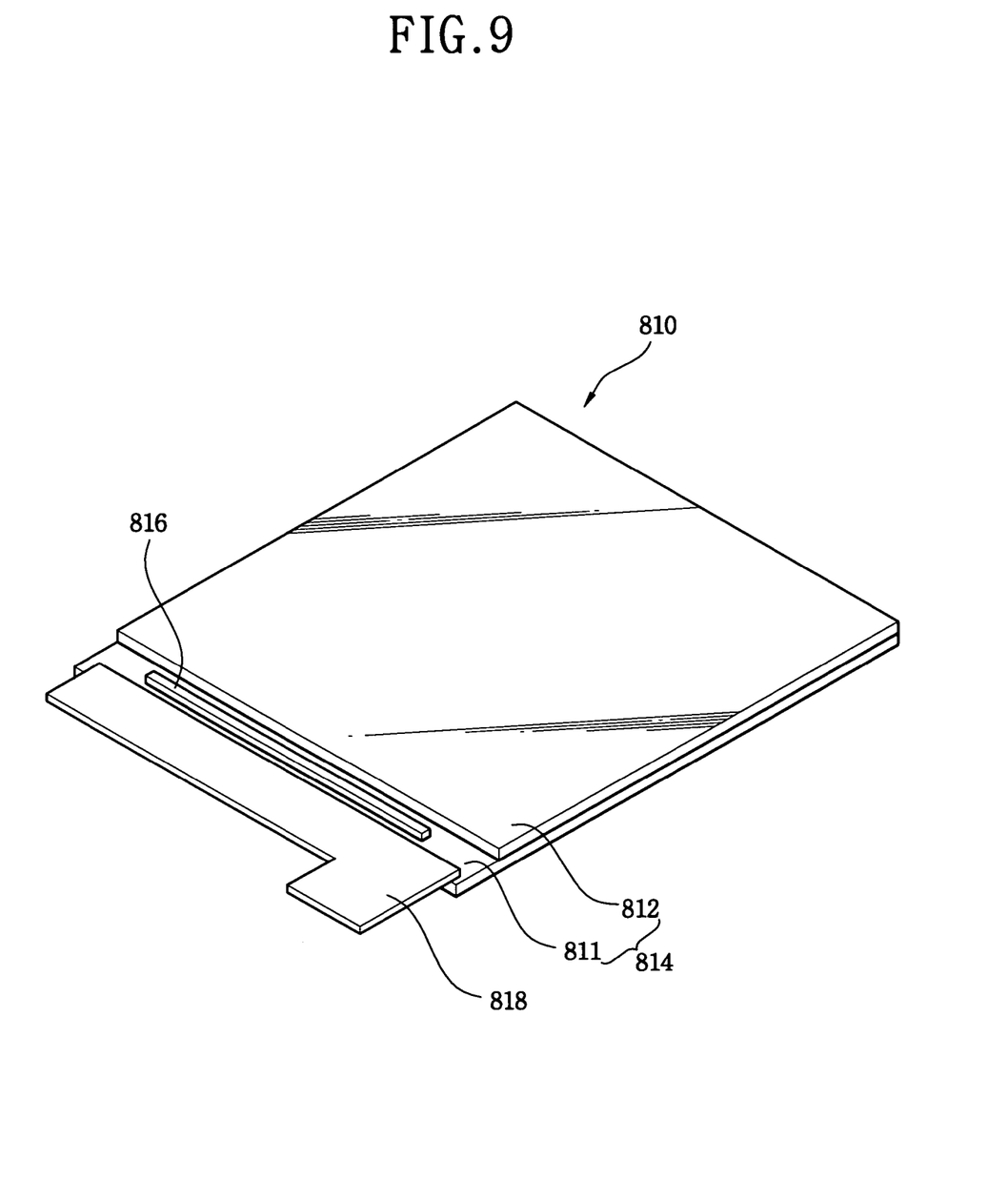
FIG. 9 is a perspective view of the first display unit in FIG. 8.

FIG. 8 is an exploded perspective view illustrating an LCD device according to an exemplary embodiment of the present invention, and FIG. 9 is a perspective view illustrating a first display unit shown in FIG. 8. In FIG. 8, the same parts as those shown in FIG. 2 are represented with like reference numerals and their detailed description will be omitted to avoid description duplication. In this embodiment, the LCD device 800 includes a first display unit 810, a second display unit 820 and the backlight assembly 100 shown in FIG. 1. It should be noted that although the LCD device 800 of this embodiment employs the backlight assembly 100 in FIG. 1, the LCD device 800 may employ any of the above described embodiments of the backlight assembly.

The first display unit 810 is disposed in the first receiving container 210, and the first display unit 810 displays images using light exiting from the first light exiting surface 124 of the first light guide plate 120 through the first optical member 150 in direction A. The first display unit 810 includes an LCD panel 814, a driving IC 816 and an FPC 818. The LCD panel 814 includes a first substrate 811, a second substrate 812, and a liquid crystal layer disposed between the first and second substrates 811, 812.

A plurality of pixels are arranged at the first substrate 811 in a matrix form, and each of the pixels is connected with a gate line extended in a first direction and a data line extended in a second direction. The gate line is insulated from the data line. A thin film transistor (TFT) is formed in each of the pixels and connected to the gate and data lines. The driving IC 816 for supplying a driving signal to the data and gate lines is formed at a selected region of the first substrate 811. The driving IC 816 may have separate chips for the data and gate lines, respectively, or a single chip for both the data and gate lines. The driving IC 816 is formed on the first substrate 811 by means of a chip on glass (COG) process.

The FPC 818 supplying a control signal, which controls the driving IC 816, is formed on a selected region of the first substrate 811 having the driving IC 816. The FPC 818 includes a timing controller controlling timing of the driving signal and a memory storing data signal. The FPC 818 is electrically connected with the first substrate 811 via an anisotropic conductive film disposed therebetween.

The second display unit 820 is disposed in the third receiving container 230, and the second display unit 820 displays images using the light exiting from the second light exiting surface 134 of the second light guide plate 130 passing through the second optical member 160 in direction B. Since the second display unit 820 has the substantially same components and structure, a detailed description of the second display unit 820 is omitted. A display area of the first display unit 810 may be substantially same as or different from that of the second display unit 820. For example, the display area of the first display unit 810 is larger than that of the second display unit 820.

The LCD device 800 also includes a first chassis 830 preventing the first display unit 810 from being separated from the backlight assembly 100 and a second chassis 840 preventing the second display unit 820 from being separated from the backlight assembly 100.

In case that the LCD device of the present invention includes the backlight assembly 400 shown in FIGS. 6 and 7, the position of the light source 110 is changed in accordance with a predetermined luminance ratio of the first to second display units 810, 820. For example, when a mobile communication terminal such as a dual cellular phone includes the LCD device of the present invention, the luminance of the first display unit 810 may be different from the luminance of the second display unit 820. In case that the cellular phone is not in operation, the first display unit 810 is also not in operation and the second display unit 820 exposed outside is in operation, so that the luminance of the second display unit 820 is greater than the luminance of the first display unit 810. In contrast, when the cellular phone is in operation, the first display unit 810 is also exposed outside to display images. In this case, the luminance of the first display unit 810 is greater than the luminance of the second display unit 820.

Therefore, when the cellular phone is not in operation, the light source 110 is moved toward the second light guide plate 130. In contrast, when the cellular phone is in operation, the light source 110 is moved toward the first light guide plate 120. For example, the light source 110 is moved by a hinge part (not shown) connected to a folder (not shown) of the cellular phone. An end portion of the hinge part is connected to the FPC 112 securing the light source 110 so that the position of the light source 110 is changed by means of rotation of the hinge part.

Having described the exemplary embodiments of the backlight assembly and the display device employing the same according to the present invention, modifications and variations can be readily made by those skilled in the art in light of the above teachings. It is therefore to be understood that, within the scope of the appended claims, the present invention can be practiced in a manner other than as specifically described herein.

What is claimed is:

1. A backlight assembly for proving light in different directions, comprising:
   a light source for generating light;
   a first light guide plate receiving the light from the light source and guiding the received light to output first light in a first direction toward a first display unit; and
   a second light guide plate receiving the light from the light source and guiding the received light to output second light in a second direction toward a second display unit,
   wherein an amount of the first light is different from an amount of the second light.

2. The backlight assembly of claim 1, wherein the first light guide plate includes:
   a first light incident surface receiving the light from the light source;
   a first light reflecting surface reflecting light provided through the first light incident surface; and
   a first light exiting surface outputting the light reflected by the first light reflecting surface.

3. The backlight assembly of claim 2, wherein the second light guide plate includes:
   a second light incident surface receiving the light from the light source;
   a second light reflecting surface reflecting light provided through the second light incident surface; and
   a second light exiting surface outputting the light reflected by the second light reflecting surface.

4. The backlight assembly of claim 3, wherein the light source has a light output surface generating the light toward the first and second light incident surfaces, the light output surface having an areal size substantially equal to a sum of areal sizes of the first and second light incident surfaces.

5. The backlight assembly of claim 4, wherein an amount of the first light is larger than an amount of the second light, the areal size of the first light incident surface is larger than the areal size of the second light incident surface.

6. The backlight assembly of claim 4, wherein the first light guide has a thickness larger than a thickness of the second light guide plate.

7. The backlight assembly of claim 4, wherein the first light exiting surface has an areal size different from an areal size of the second light exiting surface.

8. The backlight assembly of claim 4, wherein the first light reflecting surface has an areal size different from an areal size of the second light reflecting surface.

9. The backlight assembly of claim 4, wherein an amount of the second light is larger than an amount of the first light, the areal size of the second light incident surface is larger than the areal size of the first light incident surface.

10. The backlight assembly of claim 9, wherein the second light guide has a thickness larger than a thickness of the first light guide plate.

11. The backlight assembly of claim 4, wherein the first and second light incident surfaces have a substantially identical areal size.

12. The backlight assembly of claim 11, wherein the first and second light guide plates have a substantially identical thickness.

13. The backlight assembly of claim 11, wherein the light source is disposed in different positions adjacent to the first and second light incident surfaces to control amounts of the first and second lights, respectively.

14. The backlight assembly of claim 13, wherein the amount of the first light is larger than the amount of the second light, the light source being disposed such that the light output surface covers first and second areas of the first and second light incident surfaces, respectively, in which the first area is larger than the second area.

15. The backlight assembly of claim 14, wherein the first area is the entire area of the first light incident surface and the second area is a portion of the second light incident surface.

16. The backlight assembly of claim 13, wherein the amount of the second light is larger than the amount of the first light, the light source being disposed such that the light output surface covers first and second areas of the first and second light incident surfaces, respectively, in which the second area is larger than the first area.

17. The backlight assembly of claim 16, wherein the second area is the entire area of the second light incident surface and the first area is a portion of the first light incident surface.

18. The backlight assembly of claim 3, further including a reflection plate disposed between the first and second light guide plates, the reflection plate reflecting light leaking from the first light reflecting surface toward the first light exiting surface and reflecting light leaking from the second light reflecting surface toward the second light exiting surface.

19. The backlight assembly of claim 3, further including:
 a first optical member disposed on the first light exiting surface, the first optical member increasing luminance of the first light; and
 a second optical member disposed on the second light exiting surface, the second optical member increasing luminance of the second light.

20. The backlight assembly of claim 3, further including:
 a first receiving container holding the first light guide plate and the light source;
 a second receiving container receiving the first receiving container, the first light guide palate and the light source, the second receiving container having an opening through which the second light guide plate is disposed; and
 a third receiving container receiving the second light guide plate, the third receiving container being combined with the second receiving container to cover the opening.

21. The backlight assembly of claim 20, wherein the first receiving container includes an opening through which the light source is disposed.

22. The backlight assembly of claim 21, wherein the second receiving container includes a receiving recess to receive the light source disposed through the opening of the first receiving container.

23. The backlight assembly of claim 22, wherein the receiving recess has a depth substantially equal to a thickness of the light source.

24. A display device for displaying images on different display units, comprising:
 a first display unit displaying first images using first light;
 a second display unit displaying second images using second light; and
 a backlight assembly for providing the first and second lights to the first and second display units, respectively, the backlight assembly including:
  a light source for generating light;
  a first light guide plate receiving the light from the light source and guiding the received light to output the first light in a first direction toward the first display unit; and
  a second light guide plate receiving the light from the light source and guiding the received light to output the second light in a second direction toward the second display unit,
 wherein an amount of the first light is different from an amount of the second light.

25. The display device of claim 24, wherein the first and second directions are opposite to each other.

26. The display device of claim 24, wherein an amount of the first light is larger than an amount of the second light, an areal size of a light incident surface of the first light guide plate being larger than an areal size of a light incident surface of the second light guide plate.

27. The display device of claim 24, wherein the light source is disposed in different positions adjacent to light incident surfaces of the first and second light guide plates to control amounts of the first and second lights, the first and second light incident surfaces having a substantially identical areal size.

28. The backlight assembly of claim 27, wherein the amount of the first light is larger than the amount of the second light, the light source being disposed such that the light output surface covers first and second areas of the first and second light incident surfaces, respectively, in which the first area is larger than the second area.

29. The display device of claim 24, further including:
 a reflection plate disposed between the first and second light guide plates,
 a first optical member disposed on a light exiting surface of the first light guide plate, the first optical member increasing luminance of the first light;
 a second optical member disposed on a light exiting surface of the second light guide plate, the second optical member increasing luminance of the second light;
 a first receiving container holding the first light guide plate and the light source;
 a second receiving container receiving the first receiving container, the first light guide palate and the light source, the second receiving container having an opening through which the second light guide plate is disposed; and
 a third receiving container receiving the second light guide plate, the third receiving container being combined with the second receiving container to cover the opening.

30. The backlight assembly of claim 29, wherein the second receiving container includes a receiving recess to receive the light source disposed through an opening of the first receiving container.

* * * * *